United States Patent [19]

Benedict et al.

[11] 4,130,017
[45] Dec. 19, 1978

[54] FLOW RATE MEASURING DEVICE

[75] Inventors: Robert P. Benedict, Media, Pa.; John S. Wyler, Andover, Mass.

[73] Assignee: Westinghouse Electric Corp., Pittsburgh, Pa.

[21] Appl. No.: 847,528

[22] Filed: Nov. 1, 1977

[51] Int. Cl.² .............................................. G01F 1/42
[52] U.S. Cl. ....................................................... 73/211
[58] Field of Search ................. 73/194 R, 198, 205 R, 73/205 L, 211, 213; 138/37

[56] References Cited

U.S. PATENT DOCUMENTS

| | | | |
|---|---|---|---|
| 1,172,087 | 2/1916 | Westcott | 73/211 |
| 1,298,471 | 4/1920 | Dodge | 73/211 |
| 1,559,159 | 10/1925 | Bullock | 73/211 |
| 1,697,344 | 1/1929 | Campbell | 73/211 |
| 3,374,673 | 3/1968 | Trageser | 73/213 |
| 3,750,472 | 8/1973 | Ducousset | 73/211 |
| 3,930,742 | 1/1976 | Boyce | 73/194 |
| 3,945,402 | 5/1976 | Murphy | 138/37 |

FOREIGN PATENT DOCUMENTS 1126474  9/1968  United Kingdom ........................ 73/211

Primary Examiner—Herbert Goldstein
Attorney, Agent, or Firm—J. W. Keen

[57] ABSTRACT

A flow rate metering device having an inlet plenum chamber which accepts fluid flow of any velocity distribution and disperses that fluid to a homogeneous, essentially zero velocity fluid body from which a flow nozzle draws such zero velocity fluid and accelerates it therethrough to obtain a pressure drop. By measuring the pressure at selected locations upstream and downstream from the nozzle inlet, fluid flow rate through the nozzle can be metered by reference to conventional pressure differential correlations. The upstream pressure tap is preferably in the plenum chamber near the point where fluid velocity is near zero and the downstream pressure tap is preferably disposed in either of two locations: the downstream face of the flow nozzle or through the wall of a conduit into which the differential pressure nozzle discharges. Disposed within the plenum chamber is a flow deceleration device which augments the plenum chamber's inherent capability of reducing entering fluid flow velocity to substantially zero. The flow deceleration device is preferably located in a low velocity region of the plenum chamber so as to minimize pressure drop therethrough. The cross-sectional flow area of the plenum chamber is preferably at least nine times that of its inlet port and the length of the plenum chamber in the direction of normal fluid flow is preferably at least three times the inlet port's equivalent diameter.

9 Claims, 2 Drawing Figures

FLOW RATE MEASURING DEVICE

BACKGROUND OF THE INVENTION

1. Field of the Invention

This invention relates to flow rate measuring devices, and more particularly, to flow rate measuring devices which can be accurately calibrated to yield precise flow rates for Reynolds Numbers at least as high as $30 \times 10^6$.

2. Description of the Prior Art

Evaluation of the thermodynamic performance of a steam turbine necessitates determining the rate of flow of the motive fluid used therein. Closed loop turbine systems usually include a steam generator element, a turbine element, a condenser element, and a feed pump for returning condensate from the condenser element to the stream generating element. While multiple feed pump elements may be utilized as well as other heat exchanger elements such as regenerative feedwater heaters, flow rate metering devices are commonly inserted in the turbine power plant system between the condenser element and the first feed pump element. The flow rate metering device in such systems is usually a flow nozzle which discharges downstream into a conduit which carries the condensate to the first feed pump. The flow nozzle-conduit combination permits measurement of a pressure differential between the nozzle's condensate influent and effluent flow which, in turn, provides a measurement of the flow rate through the entire closed loop turbine system.

The theoretrical rate of flow for an incompressible fluid such as condensate is dependent upon the square root of the pressure drop through the flow rate meter device. Actual flow rate is related to the theoretical flow rate by a parameter commonly known in flow rate measurement art as the discharge coefficient. Discharge coefficients are usually determined experimentally for flows up to Reynolds Numbers of about $3 \times 10^6$. Steam turbine systems, however, frequently have Reynolds Numbers of $30 \times 10^6$ and higher. To date discharge coefficients have not been experimentally determined for Reynolds Numbers larger than $3 \times 10^6$ because pumps required to produce Reynolds Numbers of such magnitude are not available in calibration laboratories, thus necessitating extrapolation of existing, low Reynolds Number curves to obtain discharge coefficients for flows having Reynolds Numbers larger than $3 \times 10^6$.

Conventional fluid flow rate meter installations require an overall length of approximately 26 equivalent pipe diameters of straight piping to minimize effects of upstream and downstream elbows, valves and other restrictive elements. A series of multiple hole orifice plates or other conventional flow straightening devices are often installed upstream from the flow rate measuring nozzle to further isolate the nozzle from upstream piping disturbances which introduce swirl and other nonuniform velocity profiles making the nozzle discharge coefficients inaccurate and uncertain. In the ideal situation the discharge coefficient approaches unity, but in conventional flow rate nozzle installations, the velocity of the condensate entering the nozzle is substantial and introduces corner losses at the intersection of the nozzle and attached conduit which make the discharge coefficient artificially low and uncertain. Accurate flow rate measurement requires precise static pressure measurements upstream and downstream from the flow nozzle. It is thus desirable that static pressure measurement exclude any component of dynamic pressure which result from condensate flowing against the static pressure measuring device and registering thereon as static pressure. Many conventional flow rate nozzle installations have upstream static pressure probes which are subjected to substantial fluid velocities and downstream static pressure probes which are customarily at the nozzle's throat where the highest fluid velocity is experienced. Static pressure measurements at the throat of the nozzle have been shown to introduce errors in the required pressure measurement on the order of 1% of the dynamic head. Such errors in the downstream pressure measurement and inaccuracies in the upstream pressure measurement introduce large uncertainties in the pressure drop measurement therebetween which is required in determining the fluid flow rate. Conventional nozzle installations usually permit uncontrolled fluid expansion from the discharge end of the nozzle to the inside diameter of the discharge conduit. Such uncontrolled fluid expansion introduces further large losses in the system's total pressure resulting in a reduction in the turbine system's efficiency. Theoretical discharge coefficients, as required for extrapolation, have never been satisfactorily determined in the conventional nozzle installation because the flow therethrough has not been irrotational nor have the boundary layer characteristics been adequately defined.

Attempts to uniformalize velocity distribution prior to measuring the flow rate include U.S. Pat. Nos. 3,733,898 issued May 22, 1973, and 3,374,673 issued Mar. 26, 1968. U.S. Pat. No. 3,733,898 constitutes a vortex regulator, a flow straightener, and flow converting means which uniformalize vortices, straighten the resulting vortices, and provide a uniform velocity distribution across the diameter of the conduit respectively. While one of the embodiments of the aforementioned patent illustrates a conduit portion of increased cross-section, that portion is too small to constitute a plenum chamber. A true plenum chamber would obviate the need for the vortex uniformalizer, the vortex distributor, and the velocity uniformalizer since, prior to the fluid entering the flow rate measurement nozzle, the fluid is brought to rest or substantially so thus performing all the functions of U.S. Pat. No. 3,733,898 in a shorter flow distance and much simpler construction. U.S. Pat. No. 3,374,673 includes a structure having an increased cross-sectional flow area which permits fluid to flow through a foraminated body without suffering an appreciable pressure loss.

The prior art suffers from an inability to extrapolate discharge coefficients with any substantial certainty beyond Reynolds Numbers of approximately $3 \times 10^6$. Such inability results from a combination of causes including lack of a boundary layer theory which accurately and satisfactorily predicts fluid behavior prior to its entry into the differential pressure flow rate nozzle. The inability to accurately measure static pressure upstream and downstream from the flow nozzle, extremely long, unrestricted flow conduits for the flow metering nozzle, and large pressure losses constitute further disadvantages of the prior art.

SUMMARY OF THE INVENTION

In accordance with the present invention, an improved flow rate measuring device is provided for accurately measuring flows having high, as well as low, Reynolds Numbers. Such flow rate measuring apparatus produces a well-behaved boundary layer which is amenable to conventional boundary layer analysis and which yields theoretical discharge coefficients which accurately agree with actual discharge coefficients obtained by experimentation. Such close conformity between actual discharge coefficients and theoretical discharge coefficients obtained from the well-behaved, predictable boundary layer for Reynolds Numbers up to $3 \times 10^6$ provides better basis than heretofore existed for extrapolating such theoretical discharge coefficients for Reynolds Numbers of magnitudes higher than can now be produced in any laboratory. The invention generally comprises a plenum chamber which is substantially larger than a fluid inlet port and fluid outlet port formed therein, a differential pressure flow meter whose inlet opening is in fluid communication with the plenum chamber's outlet port, an upstream pressure tap fluidly connected to the plenum chamber, and a downstream pressure tap situated downstream from the plenum chamber's outlet port. The relative size of the plenum chamber and its inlet port is such that the velocity of fluid entering the plenum chamber through the inlet port is reduced therein to essentially zero.

In a preferred embodiment of the invention, an inlet conduit of one equivalent diameter, D, is connected to a plenum chamber of equivalent diameter 3D and length 3D. The plenum chamber has an outlet port in which a differential flow rate nozzle is disposed. The upstream end of the flow rate measuring nozzle is smaller than the plenum chamber's equivalent inside diameter and the downstream end of the nozzle discharges into a discharge conduit. The ratio of the nozzle's downstream end throat diameter to discharge conduit diameter is maximized to be preferably greater than 0.5. A perforated plate or other fluid deceleration device is disposed within the plenum chamber at a low fluid velocity location and is preferably situated at least one equivalent diameter away from the inlet port for distributing fluid entering the plenum chamber across its cross section. The upstream static pressure tap is preferably disposed through the wall of the plenum chamber to thereby provide a true static pressure indication since fluid velocity in the plenum chamber is substantially zero. The downstream static pressure tap is preferably located either in the nozzle's downstream end or through the wall of the discharge conduit.

Utilizing a plenum chamber to reduce fluid velocity therethrough to substantially zero and a nozzle inlet end which is smaller than the plenum chamber's cross-sectional dimension substantially eliminates corner losses experienced by fluid entering the flow rate measuring nozzle and promotes formation of an entering fluid boundary layer which is amenable to theoretical analysis and provides a means by which discharge coefficients can be accurately predicted by theory. Furthermore, the present invention's pressure tap locations substantially eliminate any component of dynamic velocity head from fallaciously contributing to the indicated static pressure readings. The present invention has a lower pressure drop loss through the entire apparatus than prior art, burt a higher pressure drop through the differential pressure flow nozzle resulting in a further accuracy increase over prior art flow meters. A final advantage to the present invention is that its total length is less than one-half the conventional flow meter's length.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

The present invention is primarily concerned with accurate flow rate measurement at high Reynolds Numbers. The apparatus may also be used for accurate flow rate measurement of low Reynolds Number flow, but low Reynolds Number flow, unlike high Reynolds Number flow, has discharge coefficients which may be experimentally verified. This invention is particularly useful for developing predictable, well-behaved boundary layers from which theoretical discharge coefficients can be obtained. Good agreement between theoretical discharge coefficients thus obtained and actual, experimentally determined discharge coefficients for low Reynolds Numbers provides a basis, to a high degree of certainty, for extrapolation of such theoretical discharge coefficients to higher Reynolds Numbers than can now be attained in existing laboratories.

Figure 1:
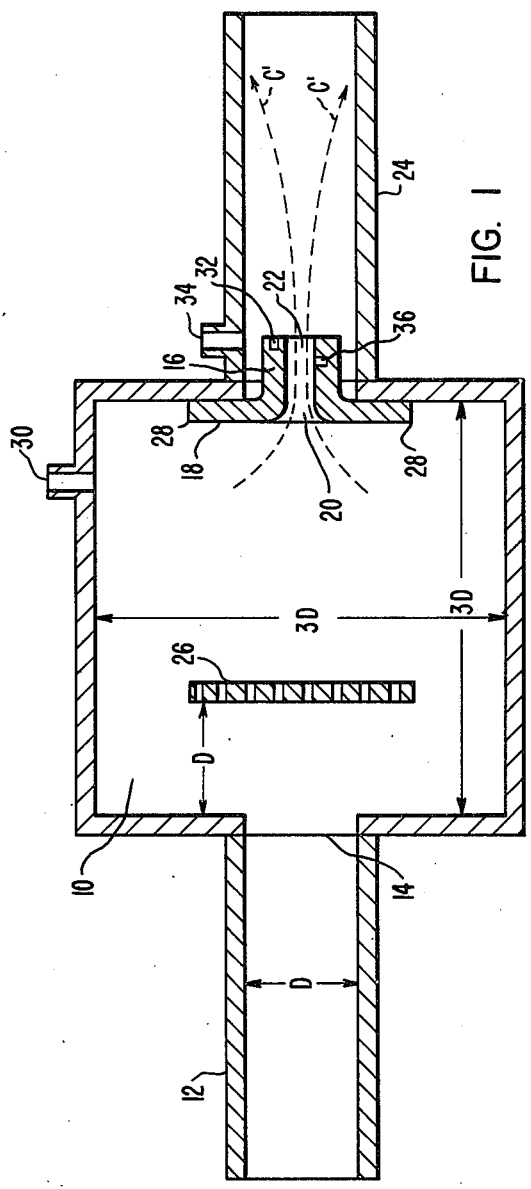
FIG. 1 is a transverse sectional view of the present invention.

The invention is shown in FIG. 1 situated between terminal points A and B. Normal flow direction for the fluid whose rate is to be measured is indicated by arrow C at the inlet end and arrows C' at the outlet end. Plenum chamber 10 receives fluid from inlet conduit 12 through inlet port 14. The inlet port 14 and inlet conduit 12 are preferably round and cylindrical respectively with inside diameter D. It is not necessary, however, that they be round or cylindrical and for such case D would be considered their equivalent diameters. Plenum chamber 10 is also preferably cylindrical in shape having a minimum diameter of approximately 3D and a minimum length of approximately 3D. Plenum chamber 10 discharges fluid entering therein through converging flow rate measuring nozzle 16 whose inlet end 18 is seen to extend radially a smaller distance than plenum chamber 10. Nozzle 16 accepts fluid from plenum chamber 10, accelerates it through a converging passage, and discharges that fluid through its outlet throat opening 22 into discharge conduit 24.

Fluid entering plenum chamber 10 through inlet port 14 slows rapidly as it transverses the plenum chamber's length approaching a substantially zero velocity within a relatively short distance after it enters inlet port 14. Fluid flow distributor decelerator 26 is disposed transversely to the inlet conduit 12 and separated therefrom within plenum chamber 10 by a distance of one equivalent diameter, D. Such separation distance permits flow distributor 26 to occupy a position in a low velocity region of plenum chamber 10 where any irreversible pressure drop sustained by the fluid is relatively small. Flow distributor 26 often constitutes a perforated plate or other restrictive device which tends to disperse a portion of the fluid in a direction parallel to the plate and perpendicular to the entering flow. Flow distributor 26 is often desirable since use of it permits a smaller chamber to be utilized and still approximate the ideal infinite plenum chamber. Flow rate metering nozzle 16 is seen to extend radially only a portion of the way to the side walls of plenum chamber 10. Such construction utilizes sharp edge 28 of nozzle 16 to separate the flow entering nozzle 16 and establish a well-defined boundary layer capable of conventional analysis. Such boundary layer definition is further simplified by the fact that fluid velocity in the vicinity of sharp edges 28 is, as previously mentioned, substantially zero.

Static pressure tap 30 is disposed upstream from nozzle 16 in plenum chamber 10 and is exposed to fluid within the plenum chamber which is at essentially zero velocity. Such zero fluid velocity provides a true static pressure indication since pressure components due to moving fluid being brought to rest have been eliminated. The downstream pressure tap is preferably disposed at location 32 in the downstream face of nozzle 16 since it can be shown that pressures in the end face of a nozzle are very good approximations to the throat pressures within the nozzle. Alternate location 34 for the downstream pressure tap is through the wall of discharge conduit 24 and has the lowest manufacturing costs and best accessibility of all possible locations. Downstream pressure tap location 36 is also a suitable choice but is less desirable than the previously mentioned locations due to the pressure tap's exposure to the high velocity region within the nozzle which causes errors in static pressure measurements made there. Outlet opening 22 for the present invention is maximized to be greater than one-half the inlet diameter of discharge conduit 24. By increasing the ratio of throat diameter to discharge conduit diameter to greater than the conventional value of 0.5, unrecoverable pressure loss can be minimized.

Figure 2:
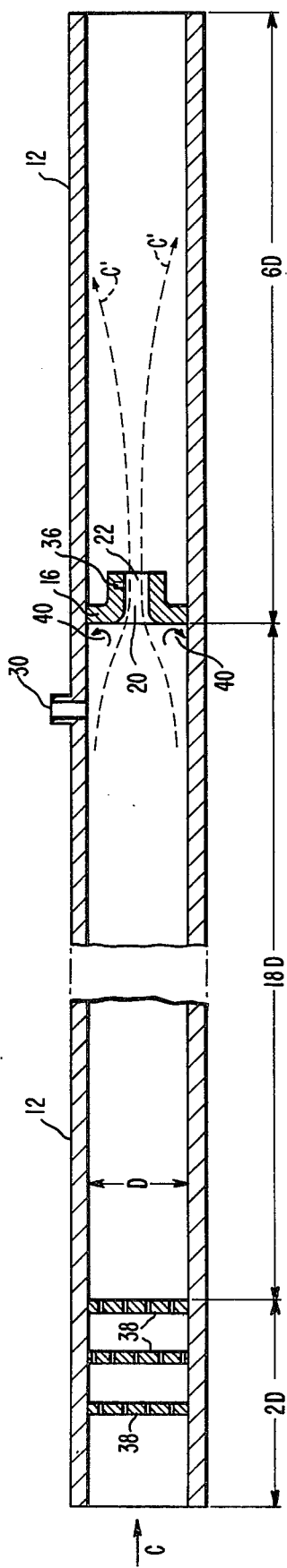
FIG. 2 is a transverse sectional view of a prior art fluid flow meter.

FIG. 2 illustrates a prior art conventional flow meter. Flow enters inlet conduit 12 through flow straighteners 38 which are very similar to flow distributor 26 except that flow straighteners 38 extend across the entire inside diameter of inlet conduit 12 and have a greater ratio of void area to closed area than does flow distributor 26. Flow straighteners 38 are usually displaced approximately 18 equivalent diameters upstream from the flow rate measuring nozzle 16 whose inlet side extends radially to the inside diameter of conduit 12. Nozzle 16 of the prior art is a converging nozzle, but has a ratio of throat diameter to discharge conduit diameter of approximately 0.5. The illustrated conventional fluid meter is situated within the inlet-discharge conduit 12. The 0.5 ratio of throat diameter 22 to discharge conduit diameter 12 was often utilized on prior art flow meter apparatus to better isolate upstream disturbances from the downstream pressure tap 33 which was customarily disposed within nozzle 16's throat. Although the 0.5 ratio tended to isolate undesirable upstream disturbances, it had a deleterious effect on the fluid flowing from the nozzle throat 22 into discharge conduit 12 and, in fact, resulted in more than twice the unrecoverable pressure loss as would be possible if a ratio of 0.6 or greater was used.

Additional losses and measurement uncertainties in prior art flow meters result from the presence of vortices which are set up by the relatively high velocity of fluid entering nozzle throat 20. Such vortices (better known as corner losses) cause highly complex flow patterns and result in boundary layers of unpredictable shape and behavior. Further, static pressure measurements at upstream pressure tap 30 and downstream pressure tap 36 are very difficult to accurately obtain since the velocities in those regions (especially in the throat region) are very high and tend to introduce inaccuracies from dynamic pressure head components as previously discussed.

Because of the aforementioned losses and measurement uncertainties, the discharge coefficients are accordingly smaller than those of the apparatus in FIG. 1 and have a poor, if any, basis for extrapolation beyond experimentally determined values. High Reynolds Number flows whose discharge coefficients are experimentally unconfirmed are common in condensate flow in power plant systems. Additionally, the conventional flow meter of FIG. 2 exhibits greater pressure drops through its flow straighteners 38 than does the present invention through flow distributor 26 due to the relatively high flow velocity experienced by flow straighteners 38. The conventional fluid meter illustrated in FIG. 2 has much larger spatial requirements than that shown in FIG. 1 as is indicated from the dimensions exemplified beneath the apparatus of FIG. 2 which references inlet conduit 12's equivalent diameter, D.

It will now be apparent that an improved flow rate measuring apparatus has been provided in which a plenum chamber is utilized to produce a well-defined, classical boundary layer at the flow nozzle's inlet which is amenable to conventional analysis. For such boundary layers the nozzle discharge coefficients can be more accurately predicted than prior art apparatus for lower Reynolds Numbers and thus have better basis for extrapolation into flow regimes of high Reynolds Numbers.

What is claimed is:

1. A flow rate measuring apparatus comprising:
    a plenum chamber including an inlet port and an outlet port, said plenum chamber having a substantially larger cross-sectional flow area than said inlet port for reducing the velocity of fluid entering said plenum chamber to essentially zero, said plenum chamber having a substantially larger cross-sectional flow area than said outlet port;
    a converging nozzle having a body portion with an inlet opening for receiving fluid from said plenum chamber and an outlet opening for expelling that fluid after it has been accelerated through a throat in the body which connecting said inlet and outlet openings, said nozzle being disposed through said plenum outlet port, said nozzle's body portion having an inlet end which bounds said inlet opening, said inlet end being disposed within said plenum chamber and extending a smaller distance in the nozzle's radial direction than does the portion of said plenum chamber radially adjacent thereto and a greater radial distance than said outlet port; and
    an upstream and a downstream pressure tap, said upstream tap being disposed in said plenum chamber and said downstream tap being disposed downstream from said plenum chamber outlet port.

2. The flow rate measuring apparatus of claim 1, wherein said downstream pressure tap is disposed about the outlet nozzle opening on a downstream face thereof.

3. The flow rate measuring apparatus of claim 1, wherein said downstream pressure tap is disposed in the nozzle's throat.

4. The flow rate measuring apparatus of claim 1, further comprising:
    a conduit for receiving fluid expelled by the nozzle's outlet opening, said conduit having a flow channel larger than said nozzle's outlet opening.

5. The flow rate measuring apparatus of claim 4, wherein said downstream pressure tap is disposed on the interior of said conduit in fluid communication with the fluid exiting said nozzle's outlet opening.

6. The flow rate measuring apparatus of claim 1, further comprising:

means for decelerating the fluid entering said plenum chamber, said decelerating means augmenting said plenum chamber's velocity reduction capability.

7. The flow rate measuring apparatus of claim 6, said decelerating means comprising:
at least one baffle plate disposed within said plenum chamber, said baffle plate being generally perpendicular to the flow and being situated in a low velocity region of said plenum chamber.

8. The flow rate measuring apparatus of claim 1, wherein said plenum chamber's cross-sectional flow area is at least nine times the cross-sectional flow area of the inlet port.

9. The flow rate measuring apparatus of claim 1, wherein said plenum chamber's length parallel to the normal direction of flow is at least three times the equivalent diameter of the inlet port.

* * * * *